(12) United States Patent
Gapontsev et al.

(10) Patent No.: US 9,716,365 B2
(45) Date of Patent: Jul. 25, 2017

(54) HIGH POWER NEODYMIUM FIBER LASERS AND AMPLIFIERS

(71) Applicants: Valentin P Gapontsev, Worcester, MA (US); Ilia Zaytsev, Burbach (DE); Mikhail Vyatkin, Fryazino (RU)

(72) Inventors: Valentin P Gapontsev, Worcester, MA (US); Ilia Zaytsev, Burbach (DE); Mikhail Vyatkin, Fryazino (RU)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 13/848,754

(22) Filed: Mar. 22, 2013

(65) Prior Publication Data

US 2014/0286362 A1    Sep. 25, 2014

(51) Int. Cl.
*H01S 3/30* (2006.01)
*H01S 3/067* (2006.01)
(Continued)

(52) U.S. Cl.
CPC ...... *H01S 3/06737* (2013.01); *H01S 3/06733* (2013.01); *H01S 3/06745* (2013.01);
(Continued)

(58) Field of Classification Search
CPC ............. H01S 3/06737; H01S 3/06733; H01S 3/06754; H01S 3/094007; H01S 3/094042;
(Continued)

(56) References Cited

U.S. PATENT DOCUMENTS

| 4,742,307 A | 5/1988 | Thylen |
| 4,963,832 A | 10/1990 | Desurvire |

(Continued)

FOREIGN PATENT DOCUMENTS

| JP | 2004063931 A | 2/2004 |
| WO | WO2010049057 A2 | 5/2010 |

*Primary Examiner* — Xinning Niu
*Assistant Examiner* — Vu A Vu
(74) *Attorney, Agent, or Firm* — Yuri B. Kateshov, Esq.; Timothy J. King, Esq.

(57) ABSTRACT

A fiber block is configured with a fiber block including a Nd-doped active fiber and a pump-light delivery fiber which has a stretch extending along the active fiber in a side-to-side configuration so as to lunch pump light into the Nd-doped core of the active fiber. The core of the active fiber is surrounded by at least one or more claddings which, like the core, have a double bottleneck cross-section with a relatively large-area central region and relatively small input and output regions. The pump light delivery fiber is structured to have a substantially dumbbell cross-section with a relatively small-area central region coextending with the central region of the active fibers. The active fiber is dimensioned so that the overall length of the active fiber is configured to provide for the maximal amplification of the laser signal in a 900 nm range while limiting amplification in the 1060 nm range to the preset threshold. The fiber block is further configured so as to have the major fraction of the unabsorbed light, supported in the relatively large-area output end region of the passive fiber, be further used for pumping a neighboring fiber block.

17 Claims, 4 Drawing Sheets

(51) Int. Cl.
*H01S 3/094* (2006.01)
*H01S 3/16* (2006.01)
*G02B 6/28* (2006.01)

(52) U.S. Cl.
CPC .... *H01S 3/06754* (2013.01); *H01S 3/094007* (2013.01); *H01S 3/094042* (2013.01); *G02B 6/2821* (2013.01); *H01S 3/1611* (2013.01)

(58) Field of Classification Search
CPC .. H01S 3/06745; H01S 3/1611; G02B 6/2821
USPC .......................................................... 372/6
See application file for complete search history.

(56) References Cited

U.S. PATENT DOCUMENTS

| | | | |
|---|---|---|---|
| 6,563,995 B2 | 5/2003 | Kane | |
| 6,614,815 B1 | 9/2003 | Kane | |
| 7,116,687 B2 * | 10/2006 | Kane et al. | 372/9 |
| 7,839,901 B2 * | 11/2010 | Meleshkevich et al. | 372/6 |

* cited by examiner

FIG. 4
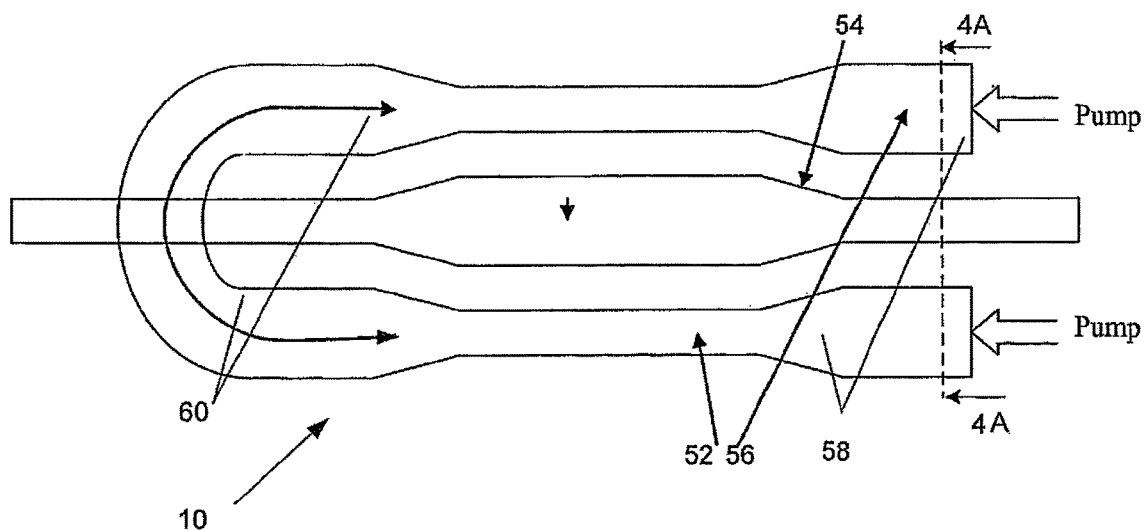
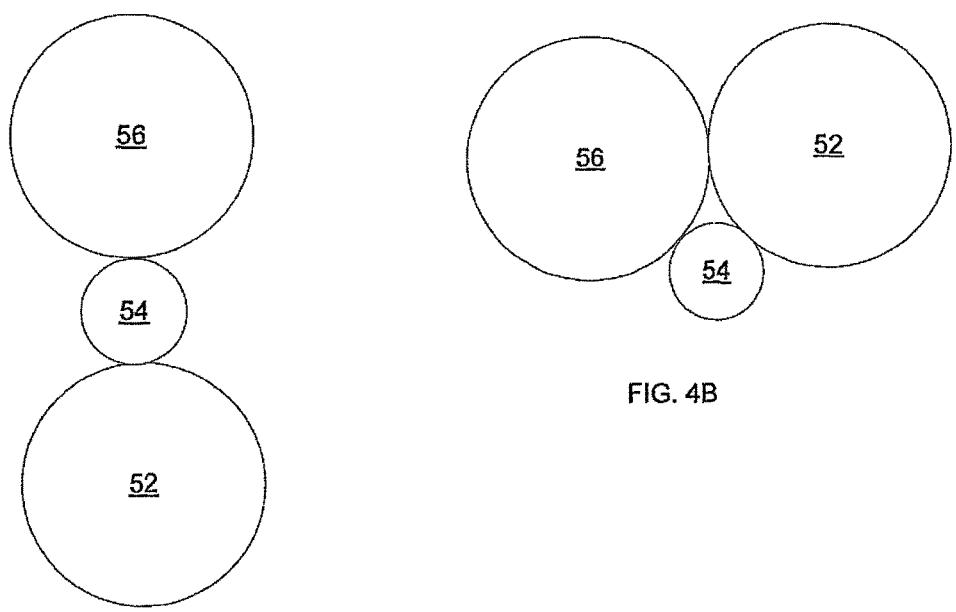
FIG. 4A
FIG. 4B

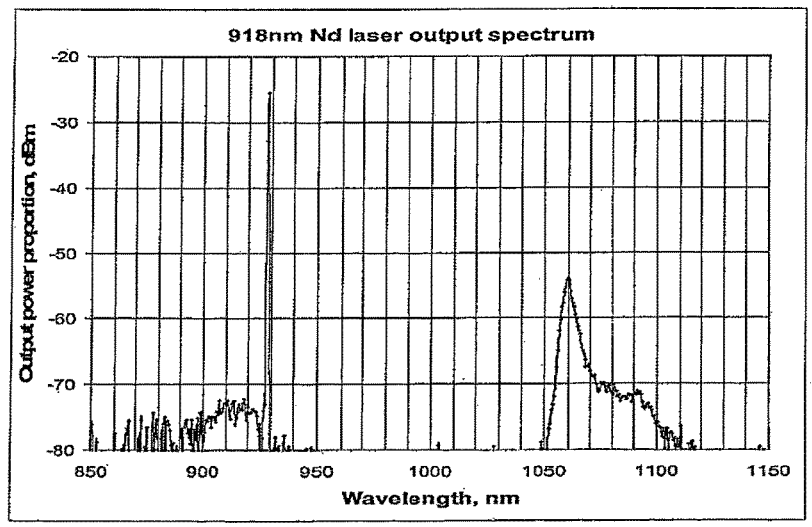
FIG. 7
FIG. 8
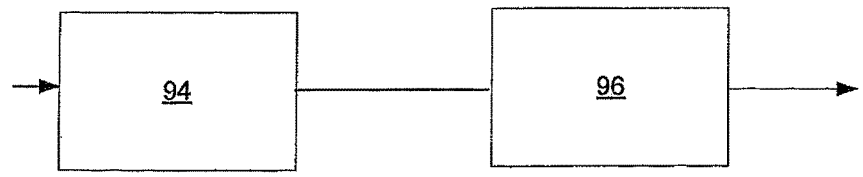
FIG. 9
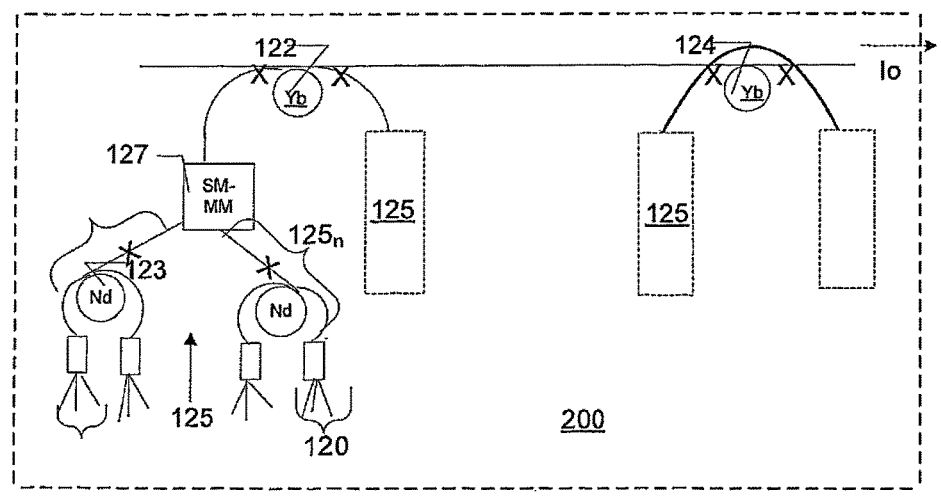

HIGH POWER NEODYMIUM FIBER LASERS AND AMPLIFIERS

BACKGROUND OF THE DISCLOSURE

Field of the Disclosure

The disclosure relates to high power fiber laser systems ("HPFLS") operative to emit radiation at main and parasitic wavelengths. More particular, the disclosure relates to a gain block with Nd-doped fibers operative to generate/amplify radiation at the desired wavelength while limiting gain at a parasitic wavelength. The disclosure also relates to a gain block with Nd-doped fibers operative to generate high-order harmonics.

Discussion of the Prior Art

Development and power scaling of fiber laser systems emitting light in a 880-960 nm luminescence range have been recently intensified because these systems find a variety of industrial applications. For example, such systems may function as a powerful pump for Yb-doped fiber laser. Alternatively, these fiber laser systems are used for realization of second harmonic generation—a nonlinear optical process associated with the generation of the double frequency and, therefore, half the wavelength, i.e., 450-470 nm. The laser systems operating in this range are known as "blue" lasers.

It's well-known that $^4F_{3/2}$-$^4I_{9/2}$ transition of neodymium ion corresponding to a 880-960 nm luminescence spectral range terminates at the ground state. Therefore, the signal in this spectral range is subjected to the ground state absorption, and as a result high population inversion is required to achieve a reasonable gain in this spectral range leading to extremely high gain around a parasitic 1060 nm wavelength. Two most common approaches have been traditionally used to solve this problem.

One of the known approaches is based on reducing the concentration of active ions in fiber and the length of active fiber. Implementation of this approach usually requires the use of fibers with very large core diameters for efficient absorption of pump radiation. This in turn entails the substantial increase in gain of the higher order modes. It should be noted that effects of high parasitic gain in 1060 nm range and growth of higher order modes amplification are superimposed on each other and lead to catastrophic growth of gain for higher order modes at 1060 nm. This limitation may be overcome by reducing the core/cladding refractive index difference and inducing bend losses for higher order and even fundamental modes in the long-wavelength spectral range.

Another widely used in practice approach is based on the suppression of the fundamental mode of active fiber in the long-wavelength range through the use of w-profile active fiber. Typically, this approach requires the use of very small core diameters of the active fiber. This entails the use of high concentration of active ions necessary to have reasonable pump absorption and, as a consequence, the high parasitic gain in 1060 nm spectral range that can reach hundreds of dB. It means that the suppression in a w-profile active fiber should exceed hundreds of dB, which is extremely difficult to implement or monitor. Besides, such a high concentration of neodymium ions would result in reduction of pump conversion efficiency. In addition to that compression of mode field diameter corresponding to a small core diameter would lower the threshold of nonlinear phenomena. All of the above mentioned reasons hinder the realization of high-performance and high-power neodymium fiber laser in the 900 nm range.

In summary, the gain block based on a Nd-doped fiber is characterized by amplification at respective signal and parasitic wavelengths. The gain at parasitic wavelengths in a 1060 nm range at the desired value of the gain at signal wavelength in a 900 nm range is a function of the overall length of the Nd-doped fiber and concentration of active ions. Typically, with the increase of fiber length and concentration, the gain in the parasitic range also increases.

The pump absorption in gain blocks in a Nd-doped fiber is also proportional to the length of the Nd-doped fiber and concentration of active ions. Thus, increasing pump absorption by having the greater length and higher Nd ions concentration inevitably leads to the growth of parasitic amplification.

A need therefore exists for a gain block based on a Nd-doped fiber and a method for manufacturing the block in which the pump light absorption is improved without the necessity for the increased dopant concentration and the increased active fiber length.

Another need exists for a high performance and high-power fiber laser system provided with the neodymium fiber gain block.

Still a further need exists for a fiber laser system based on the neodymium-doped fiber gain block for generating a second or higher harmonic of the gain block's radiation.

SUMMARY OF THE DISCLOSURE

The configuration of the disclosed Nd-doped gain block and applications of the block in various inventive optical schemes satisfy these needs. The disclosed gain block is configured with a side-pumping ("SP") configuration which includes a fixed-length of Nd-doped active fiber and a passive pump delivery fiber optically coupled to each other along respective opposing sides. The SP configuration is structured with a high-ratio between the core area Ac of the active fiber to the overall pump guiding clad area Aclad. As known, the greater the ratio, the higher the pump light absorption. Accordingly the configurations of respective active and delivery fibers provide for a highly efficient absorption of pump light and high gain at the desired wavelength in a 900 nm range. At the same time, the parasitic gain in 1060 nm range does not exceed a reasonable threshold.

In particular, the elongated active fiber has a double bottleneck shape defined by two spaced small-area end regions and a large-area central region, whereas the delivery fiber has a dumbbell shape with a small-area central region extending between opposite large-area end regions. The central regions of the respective fibers are configured with a ratio between the core area and total clad area selected so as to allow for an increased pump light absorption rate. Thus the disclosed gain block and method for manufacturing the same, unlike the above-discussed techniques, do not necessitate greater fiber lengths and higher concentration for improving the pump-light absorption.

However, even with the increased ratio between the core and total clad areas, a portion of pump light is typically remains unabsorbed and therefore underutilized. The latter of course decreases the efficiency of the gain block. Hence, the disclosed pumping arrangement is configured so that the unabsorbed pump light is utilized after the initial pass thereof through the central absorption region of the core. One of the disclosed pumping arrangements is configured so as to return the unabsorbed light back to the same absorption region but in a direction opposite to the initial one. The other configuration provides for guiding the unabsorbed pump light to a neighboring gain block where it is used for pumping.

BRIEF DESCRIPTION OF THE DRAWINGS

The above and other features and advantages will become more readily apparent from the following specific description accompanied by the drawings, in which

FIG. 4 is a further configuration of the SP arrangement of the block of FIG. 1

FIG. 4A is a schematic view of another configuration of the fiber block of FIG. 4.

FIG. 4B is a view of still another configuration of the fiber block of FIG. 4;

FIG. 7 is a spectrum of the output signal of the laser systems of FIGS. 5 and 6.

FIG. 8 is a schematic of a blue laser configured with the disclosed fiber block of FIGS. 1-4.

FIG. 9 is a diagrammatic view of a high power fiber laser system having a pump configured with the fiber block of FIGS. 1-4.

SPECIFIC DESCRIPTION

Figure 1:
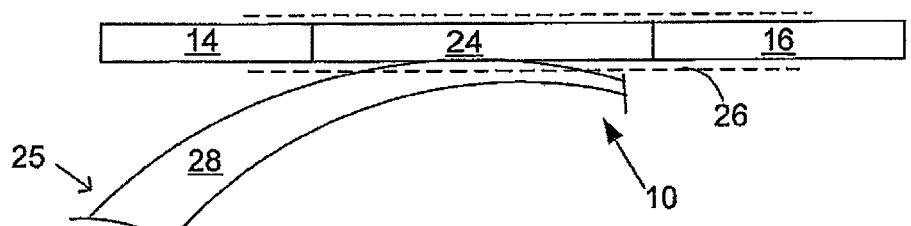
FIG. 1 is a schematic view of the disclosed fiber block.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. The words "couple", "operatively connected" and similar terms do not necessarily denote direct and immediate connections, but also include connections through intermediate elements or devices.

FIG. 1 schematically shows a fiber block 10 configured as a fiber amplifier or fiber laser and including, for example, a multi-mode (MM), multi-clad active fiber 24 whose opposite ends are butt-spliced to respective single mode (SM) input and output passive fibers 14 and 16. A pump 25, configured with one or more light sources, is operative to radiate pump light coupled into active fiber 24 in accordance with a SP arrangement. A coreless MM pump-light delivery passive fiber 28 has a stretch operatively connected to a stretch of active fiber 24 so that the coupled stretches define a coupling region. The pump light is launched into active fiber 24 and at least partially absorbed by gain medium of the fiber's doped core along the coupling region. If necessary, the connected fibers may be pulled away from one another in response to external forces applied thereto. The Nd ions are introduced into the active fiber's core at a given concentration providing for the desired gain in a 900 nm wavelength range and reasonable gain in a 1060 nm range.

A polymeric sleeve 26 surrounds fibers 24 and 28 and is operatively connected thereto along substantially the entire coupling region. The fibers 24 and 28, respectively, in combination with sleeve 26 are the essential components of the SP configuration.

Figure 2:
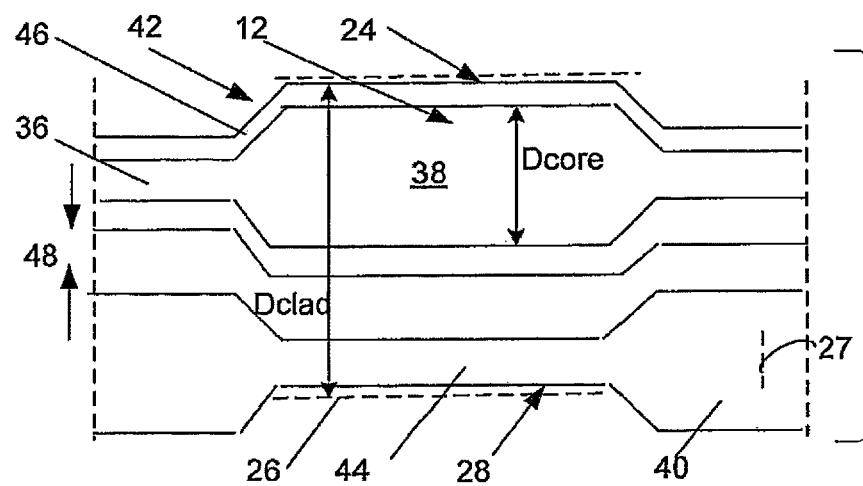
FIG. 2 is one configuration of the SP arrangement of the fiber block of FIG. 1.

FIG. 2 illustrates one aspect of the disclosed geometry of respective active 24 and pump-light delivering passive 28 fibers of fiber block 10. The core 12 of active fiber 24 may be surrounded by multiple claddings 42 (only one is shown) coextending with the core. The geometry of active fiber 24, i.e. the cross-sections of respective core 12 and cladding 42 along the longitudinal fiber axis, has a double bottleneck-shaped cross-section. The latter includes a narrow uniformly dimensioned input end region 36, uniformly dimensioned absorption central or mid-region 38, which has an area Acore larger than that one of the input region, and a frustoconical input transformer region 46 bridging the end and mid core regions. To complete the double bottleneck section, core 12 further has output frustoconical transformer and end regions. The core 12 may support a single transverse mode or multiple modes.

While core area Acore of core's absorption region 38 is increased, the area of a central or mid-region 44 of delivery, coreless fiber 28, and consequently overall clad area Aclad are decreased. Generally, the cross-section of delivery fiber 28 is further referred to as a dumbbell-shaped cross-section implying any shape characterized by a relatively small-area central region and relatively large-area end regions. The increasing and decreasing coefficients of the respective fibers are not arbitrary. The coefficients are so selected that the total clad area of the central regions is preferably the same as the total clad area of the input end of the entire SP structure of FIG. 2. The latter allows the power density of pump light and therefore the numerical aperture of the latter remain unchanged; otherwise, the structure would have increased pump light losses.

In general, the determination of the decreasing coefficient of delivery fiber 28, provided that the latter maintains a relatively small aperture, is based on the fact that the reduction of a clad area of fiber causes the numerical aperture (NA) of this fiber to enlarge. Assuming, for example, that initial delivery fiber 28 maintains a NA of 0.1 and sleeve 26 maintains the NA of 0.4, the overall clad area may be reduced in four times without substantial pump light losses.

In certain situations it is desirable that gain block 10 would emit not only powerful radiation in the desired 900 nm range while limiting the gain in the 1060 nm range, but also it would output the radiation that may approximately have the desired number of modes. Often, high quality light radiated by a fiber laser system requires very few or even substantially single, preferably, fundamental mode. The excitation of substantially only fundamental or very few modes occurs if mode field diameters (MFD) of respective SM passive fibers 14, 16 and fundamental mode supported by core 12, which in this case has a MM configuration, to a large extent match one another. Accordingly, the opposite ends of active fiber 24 are configured so as to allow a SM mode supported by input fiber 14 to excite substantially a fundamental or very few modes in MM core 12 as the SM propagates through the splice region between these fibers.

Figure 3:
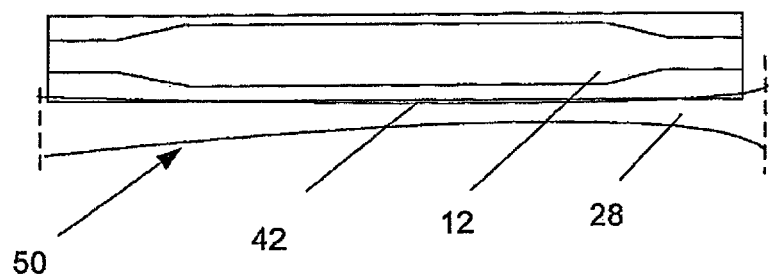
FIG. 3 is a modified configuration of the active fiber of fiber block of FIG. 1.

FIG. 3 illustrates the modification of the SP structure of FIG. 2 providing for the enhanced absorption of pump light pre length unit so as to emit radiation with the desired gain at the working wavelength in the 900 nm range while limiting an unacceptable gain at parasitic wavelength around 1060 nm. The active fiber 50 is configured with a uniform, not enlarged cladding diameter 42; the core 12, however, has a bottleneck or double bottleneck-shaped cross-section. A pump-light delivery coreless MM passive fiber is shown with a reduced area along the coupling region. Accordingly, the ratio between the area Acore of core 12 and the overall cladding area Aclad, which is a sum of cladding areas of respective active, passive and sleeve fibers, is relatively high, and the absorption at the desired wavelength is enhanced.

Typically, not all pump light is absorbed by the gain medium of the active fiber's core. In a configuration in which the pump light is coupled initially only into the input end region of active fiber 24, the area of the output end region of passive delivery fiber 28 is configured to be N times larger than the area of the output region of active fiber 24. The above disclosed relationship between the areas of respective active and passive fibers allows the unabsorbed light at the end of the coupling regions to be distributed between active and passive. The passive delivery fiber 28, thus would have the N times more of the unabsorbed pump light than the output end of active fiber 24. Preferably, the area of the output end region of delivery fiber 28 is about 7 to about 10 times greater that that one of fiber 24. Structurally, the opposite input and output ends of the delivery fiber may be uniformly shaped and dimensioned or not uniformly. Similarly, the opposite small-area end regions of the active fiber may or may not be uniformly configured.

The unabsorbed pump light coupled into passive fiber 28 maybe reused for pumping the next gain block, as disclosed below. Alternatively, the remaining pump light can be reflected back by a reflector 27 for pumping active fiber 24 in the opposite direction. The reflector 27 may be configured as fiber mirror, bulk mirror or others.

FIG. 4 illustrates a further modification of the SP configuration of gain block 10 configured with two passive fibers 52, 56 which flank an active fiber 54. The active fiber 54 has a MM core doped with a gain medium, such as Nd dopants, capable of generating/amplifying radiation at the desired and parasitic wavelengths. The pump light may be coupled into both passive fibers 52 and 56, respectively, in the same direction, which is preferably opposite to the forward-propagating direction of a signal light. The geometry of passive fibers 52, 56 corresponds to the geometry of delivery passive fiber 28 of FIG. 2 and, thus, has a dumbbell-shaped cross-section. Alternatively, a single passive fiber arranged in a U-shaped form may be used with multiple spaced small-area central regions extending along the central region of active fiber 54. The configuration of active fiber 54 may be one those shown in FIGS. 2 and 3. The architecture of the SP configuration of FIG. 4 may have all three fibers aligned in a plane transverse to the longitudinal axes of respective fibers, as shown in FIG. 4A. Alternatively, the fibers may be positioned to define a triangular shape of FIG. 4B in the transverse plane. The fibers have respective coextending longitudinal central regions coupled to one another.

The passive delivery fibers 52, 56, respectively, have their distal ends, which are spaced from the respective pumps together, fused which allows the pump light unabsorbed during a first pass of this light, for example, from passive fiber 52 to passive fiber 56, to be further absorbed during the pass in the opposite direction from fiber 56 to fiber 52. Accordingly, the absorption of the pump light is greatly enhanced in the illustrated configuration. Preferably the distal ends of respective passive fibers are fused in the vicinity of the core end region spaced from the input end regions of the respective delivery fibers.

In summary, all of the above disclosed embodiments can be illustrated by the following example. Suppose a gain block is configured with a fiber having the core which is doped with Nd ions at a certain concentration PPMx. The gain block is required to produce a 5 dB gain at a 920 nm wavelength, but not to have gain at the parasitic wavelength higher than 30 dB. Knowing the dopant concentration and target gain at both working and parasitic wavelengths, the overall minimally possible length of the Nd fiber should not exceed 30/PPMx. Having determined the minimal possible length of the ND-doped fiber limiting the preset gain at the parasitic wavelength, it is necessary now to provide for a maximum absorption rate along the determined length in order to have the 5 dB gain at 920 nm wavelength.

Figure 5:
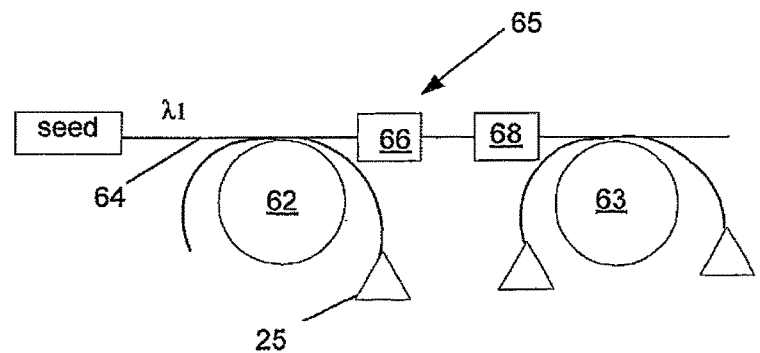
FIG. 5 is a schematic view of the disclosed in-line fiber laser system configured with the fiber gain block of FIG. 1.

FIG. 5 illustrates a high power in-line fiber laser system 65 having a typical MOPA configuration. The system 65 includes a seed source outputting a signal at the desired wavelength $\lambda 1$ at, for example, 918 nm which is coupled into a passive fiber 64 delivering this light to a Nd-doped active fiber 62. A pump 25 may include one or multiple laser diodes generating pump light at, for example, a 808 nm wavelength, which is coupled into an active fiber 62 of booster gain block 63.

The preamplifier 62 configured in accordance with one of the above disclosed embodiments provides gain for a light signal at the desired 918 nm and parasitic 1060 nm wavelength. The light signal is coupled into a filter component 66 operative to discriminate between the parasitic and main frequencies by filtering out the parasitic frequencies. The filter 66 may be selected from a passive fiber provided with long-period or slanted fiber grating, a passive fiber with an increased concentration of samarium ($Sm^{3+}$) or other similarly functioning dopants known to one of ordinary skilled in the art, passive fiber with a W refractive index profile or bulk optics. The filtered light is further coupled into an isolator 68 configured to prevent back reflected radiation from propagating towards the upstream optical components.

Finally, the light is coupled into a booster stage including gain block 63 which is also configured in accordance with the above disclosed modification of the SP structure. The booster stage is pumped by the laser diodes. All passive and active fibers are butt spliced to one another and configured with respective MFDs which substantially match one another. The system 65 has been tested and exhibited the maximum output power of more than 102 W in a 900 nm range with $M^2 \sim 1.05$ at 181 W pump power level. FIG. 8 illustrates the output spectrum of laser system 65 clearly showing a substantially amplified light in the desired wavelength and limited amplification of the light signal in the parasitic wavelength range.

Figure 6:
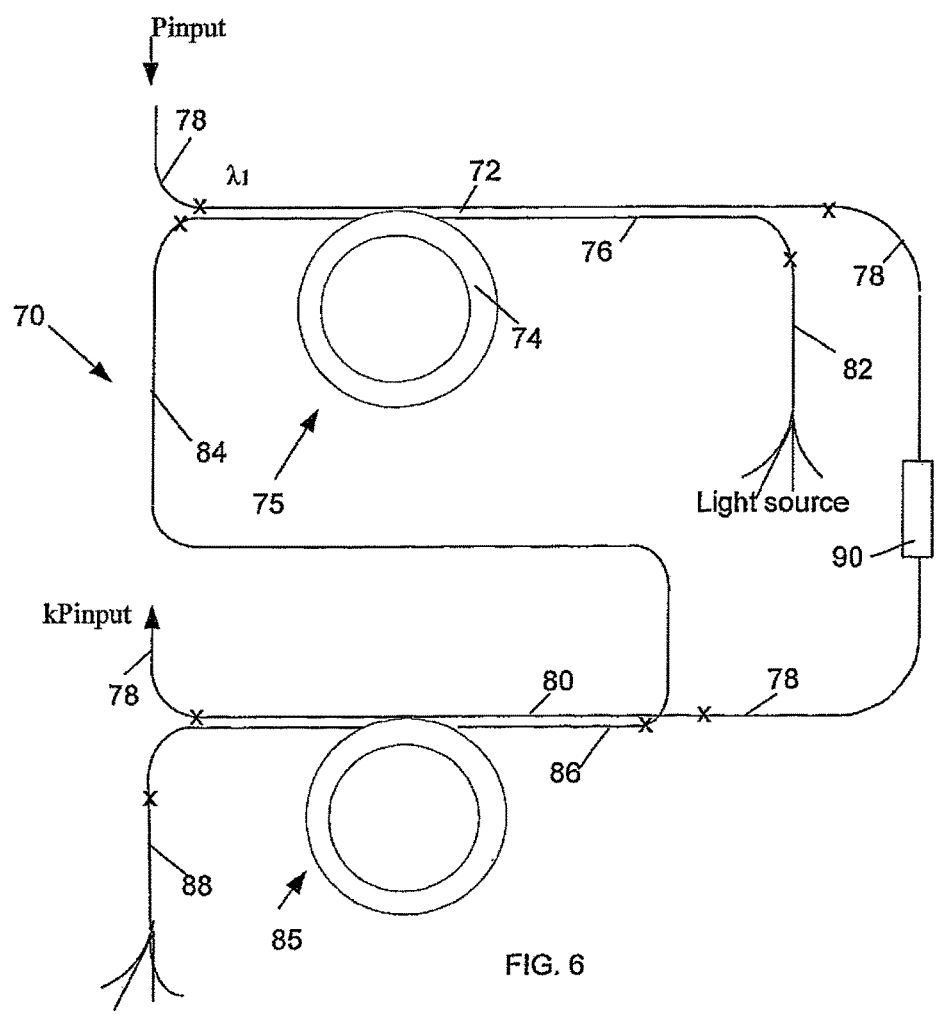
FIG. 6 is a schematic view of another configuration of the disclosed high power laser system configured with the fiber block of FIG. 1.

FIG. 6 illustrates the configuration of each of the multiple cascades of high power fiber laser system 70 provided with gain blocks which are disclosed above. The configuration of system 70 illustrates efficient use of pump light remaining in the passive pump-delivery fiber of one amplifying stage for additional pumping of the active fiber of the following amplification stage.

A SM passive fiber 78 supports the propagation of a signal at the desired wavelength $\lambda 1$ and delivers the light to a double clad, MM Nd-doped fiber 74 of an upstream gain block 75 having a double bottleneck shape. The signal light at a parasitic frequency is further filtered out as the amplified signal light propagates along passive SM fiber 78 through filter 90 configured similarly to filter 66 of FIG. 5. Finally, the amplified light at the desired frequency propagates through another SM passive fiber 78 and is coupled into a double-clad MM Nd-doped fiber 80 of adjacent gain block

85 where it is further amplified so as to emit the radiation in the desired wavelength range at kPinput, wherein k is a gain coefficient.

A pumping assembly includes a plurality of light sources having respective outputs combined into a coupler 82 which is fused to one end of a MM coreless pump-light delivery fiber 76 supporting the propagation of pump light in a direction opposite to that one of the signal. The pump light is coupled only into one side of the SP configuration, and the portion of this light, which remains in delivery fiber 72, is further coupled into a MM passive fiber 84. Eventually, the remaining pump light is coupled into a MM pump-light coreless delivery fiber 86 of downstream gain block 85.

The gain block 85 has its own pump arrangement with one or more laser diodes having respective outputs combined into a coupler 88 which is fused to pump-light delivery fiber 86. As a result, the pump light is coupled into the cladding of active fiber 80 of block 85 in a direction opposite to the direction of the pump light which is delivered from gain block 75. The pump light remaining in pump-light delivery fiber 86 is further guided towards upstream gain block 75 where it is launched into the cladding of active fiber 72 and further crosses the core of active fiber 72 so as to be absorbed. Thus, the pump light arrangement allows the pump light, remaining at the output of each of the pump-light delivering fibers, to propagate towards the other delivering fiber for additional pumping of the active fiber.

FIG. 7 illustrates a "blue" fiber laser system. Illustrated diagrammatically, the system includes a gain block 94 configured in accordance with the present disclosure and including a Nd-doped cladding-pumped active fiber and MM pump-light delivery fiber. As in all of the above-disclosed modifications, gain block 94 may be configured as a laser or amplifier operative to output laser light at the desired wavelength in a 900 nm range. The output light is coupled into a second or higher order harmonic generator 96 operative to double the frequency of the coupled light and emit the output radiation at a wavelength ranging between about 450 nm and about 470 nm.

FIG. 9 illustrates a powerful fiber laser system 115 provided with multiple gain blocks each based on an multimode multiclad fiber 110, 112, and further has multiple pumping assemblies 125. Each pumping assembly 125 has a plurality of channels $125_{1-n}$, each configured with, preferably, a SM Nd fiber laser 123 which is pumped by a respective array of laser diodes 120. The Nd fiber laser 123 is configured in accordance with the optical schemes of FIGS. 2-6. Preferably a plurality of SM Nd lasers 123 is combined by a SM-MM combiner 127. The Nd fiber lasers 123 each generate an optical output at a wavelength of about 900-940 nm. The output of the SM-MM combiner 127 are coupled to respective inputs of Yb fiber laser block 122, 124 lasing an optical output Io at a wavelength of about 970-1000 nm or longer depending on gratings which are written in respective passive fibers defining a resonant cavity which receives a gain block. The closeness of the pump emission wavelength of Nd lasers in the desired 900 nm range to that one of Yb output leads to a substantially decreased heat generation.

A process of manufacturing respective active and delivery fibers 24, 28 of FIG. 2 includes simultaneous withdrawal of the fibers from respective preforms. The speed at which the fibers each are withdrawn is strictly controlled to receive the desired area enlargement and reduction of respective central regions of fibers 24, 28 and is not uniform. Furthermore, respective speeds at which fibers 24, 28 are withdrawn are not the same. As the fibers 24, 28, respectively, are modified, each pair of enlarged and reduced area central regions of the respective fibers are removably attached to one another so it is easy separate them by applying an insignificant force.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

The invention claimed is:

1. A fiber laser system comprising at least one fiber block configured with:
   an active fiber extending along a longitudinal axis and provided with concentric outer cladding and inner double bottleneck-shaped Nd-doped core which is operative to radiate a laser signal at a working wavelength and a parasitic wavelength; and
   at least one dumbbell-shaped coreless delivery fiber guiding pump light to the active fiber, the active and delivery fibers having respective axially coextending enlarged-area and reduced-area central regions which axially extend from respective input end regions, the active and delivery fibers being configured so that, for a shortest possible length of the active fiber and a given concentration of Nd dopants, a ratio between respective enlarged-area central core region and total clad area of the central regions of the respective active and delivery fibers is selected to provide the active fiber with a desired gain at the working wavelength and a preset gain at the parasitic wavelength, and
   the total clad area of the central regions and a total area of input end regions of respective active and delivery fibers are substantially equal to one another to provide for such a pump light absorption rate in the enlarged-area central region that the active fiber is structured with the shortest possible length which allows for the desired gain at the working wavelength and the preset gain at the parasitic wavelength; and
   a protective fiber sleeve surrounding the central regions of respective active and delivery fibers, the total clad area of the central regions of the respective active and delivery fibers being reduced at a coefficient at least equal to a ratio between numerical apertures of respective protective sleeve and delivery fibers.

2. The fiber laser system of claim 1, wherein an output end region of the delivery fiber is configured to contain N times more of an unabsorbed pump light than an output end region of the active fiber, the N being a ratio between an area of the output end region of the delivery fiber to a clad area of the output end region of the active fiber.

3. The fiber laser of claim 2 further comprising a reflective component coupled to the output end region of the delivery fiber, and a pump unit radiating the pump light coupled into an input end of the delivery fiber, wherein the reflective component is configured to backreflect the pump light, unabsorbed along the shortest possible length of the active fiber, towards the input end region of the delivery fiber so as to re-launch the unabsorbed pump light into the central region of the active fiber.

4. The fiber laser system of claim 1 further comprising another fiber block configured similarly to the one fiber block and operative to the laser signal at the main and parasitic wavelengths, the pump light delivery fibers of respective one and other gain blocks being in optical contact to one another so that an unabsorbed light remaining in the output region of the delivery fiber of the one fiber block is guided to the delivery fiber of the other fiber block which launches the received unabsorbed pump light into the central enlarged-area region of the active fiber of the other fiber block.

5. The fiber laser system of claim 4 further comprising a light source generating the pump light which is coupled into the delivery fiber of the one fiber block, and a reflective component coupled into an output large-area end region of the delivery fiber of the other fiber block and operative to backreflect the unabsorbed pump light remaining in the output region of the delivery fiber of the other fiber block.

6. The fiber laser system of claim 4 further comprising two light sources generating respective pump lights coupled into respective delivery fibers of the fiber blocks, wherein the unabsorbed pump light in one of the fiber blocks is operatively coupled into the delivery fiber of the other block which launches the received unabsorbed pump light into the active fiber of the other fiber block.

7. The fiber laser system of claim 6 further comprising:
an optical filter located between the one and other fiber blocks, and
an optical waveguide guiding the laser signal between the fiber blocks through the optical filter which is configured to transmit the laser signal at the about 900 nm wavelength between the blocks and block further propagation of the laser light at the parasitic 1600 nm wavelength.

8. The fiber laser system of claim 7, wherein the optical filter is selected from the group consisting of a long-period fiber grating, slanted fiber grating, fiber with an increased concentration of samarium ($Sm^{3+}$), fiber with a W refractive index profile and bulk optics and a combination of these.

9. The fiber laser system of claim 1 further comprising a gain block provided with an Yb-doped fiber and an output coreless fiber guiding the laser signal from the fiber block to the gain block so that the fiber block with the Nd-doped active fiber is configured as a pump for gain block, the parasitic wavelength being in a 1060 nm range and the working wavelength being in a 900 nm range.

10. The fiber laser system of claim 1 further comprising a nonlinear crystal receiving laser radiation from the fiber block and operative to double a frequency thereof so as to output light predominately in a 450-470 nm range.

11. A method of configuring a fiber laser system of claim 1, comprising:
(a) drawing an active fiber at a non-uniform speed thereby providing a core of the active fiber with a double bottleneck shape including axially-spaced opposite end regions and a central region which has an area greater than that one of each of the end regions, the core being doped with a concentration of Nd-ions and having a shortest possible length at which a gain in parasitic 1060 nm wavelength range does not exceed a preset value;
(b) simultaneously with (a) drawing a pump-light delivery coreless fiber at a non-uniform speed different from the non-uniform speed in step (a), thereby providing the delivery fiber with a dumbbell shape in which a central region has an area smaller than an area of each of opposite end regions,
(d) simultaneously with (a) and (b) removably coupling the central regions of respective active and passive fibers, wherein the central regions are configured with a ratio between the area of the central core region and a total clad area of the coupled central regions of the respective fibers that provide the active fiber, for the given dopant concentration and shortest length of the active fiber, with an optimal gain in a working wavelength range.

12. The method of claim 11 further comprising providing a protective fiber sleeve over claddings of respective active and delivery fibers along at least the coupled central regions, wherein drawing the fibers includes reducing a clad area of the central region of the delivery fiber proportionally to a ratio between numerical apertures of the sleeve and delivery fiber, respectively.

13. The method of claim 11, wherein drawing the fibers further includes
providing one of the opposite end regions of the delivery fiber with an area larger than an area of coextending end region the active fiber, thereby collecting a larger portion of the pump light, which is not absorbed in the central core region, in the one end region of the delivery fiber, and
either coupling a reflective component to the one end region of the delivery fiber thereby guiding the unabsorbed large portion of the pump light back to the other end region of the delivery fiber so as to re-pump the central core region; or
guiding the unabsorbed large portion of the pump light towards coupled central regions of respective another active and delivery fibers, thereby using the large portion of the unabsorbed pump light to pump a central core region of the other active fiber.

14. A fiber laser system extending along a longitudinal axis and comprising at least one fiber block configured with:
an active fiber extending along a longitudinal axis and provided with concentric outer cladding and inner double bottleneck-shaped Nd-doped core which is operative to radiate a laser signal at a working wavelength and a parasitic wavelength; and
first and second dumbbell-shaped coreless delivery fibers guiding pump light to the active fiber, the active and delivery fibers having respective axially coextending enlarged-area and reduced-area central regions configured so that the central reduced-areas of the delivery fibers substantially coextend with the central region of the core of the active fiber along the longitudinal axis and are aligned with the central core region in a plane which extends transversely to the axis of symmetry to provide for such a pump light absorption rate in the enlarged-area central core region that the active fiber is structured with a shortest possible length which allows for a desired gain at the working wavelength while limiting a gain at the parasitic wavelength to a preset threshold.

15. The fiber laser system of claim 14 further comprising a pump light source radiating the pump light which is coupled into an input end of one of the delivery fibers, output regions of respective delivery fibers being fused to one another in a vicinity of an end of the central core region axially spaced from the input end of the one delivery fiber, wherein the fused delivery fibers define a U-shaped configuration.

16. The fiber laser of claim 14, wherein the pump light source has two pump units each radiating the pump light, the radiated pump lights being coupled into respective input regions of the U-shaped delivery fiber so as to propagate in opposite directions.

17. A fiber laser system extending along a longitudinal axis and comprising at least one fiber block configured with:
an active fiber extending along a longitudinal axis and provided with concentric outer cladding and inner double bottleneck-shaped Nd-doped core which is operative to radiate a laser signal at a working wavelength and a parasitic wavelength; and first and second dumbbell-shaped coreless delivery fibers guiding pump light to the active fiber, the active and delivery fibers having respective axially coextending enlarged-area and reduced-area central regions configured to provide for such a pump light absorption rate in the enlarged-area central region of the core of the active fiber that the active fiber is structured with a shortest possible length which allows for a desired gain at the working wavelength while limiting a gain at the parasitic wavelength to a preset threshold, the central reduced-area central regions of respective delivery fibers axially coextending with the enlarged-area central region of the active fiber, wherein respective active and delivery fibers define a triangular configuration in a plane which extends transversely to the longitudinal axis.

* * * * *